(12) United States Patent
Nomura et al.

(10) Patent No.: US 8,746,392 B2
(45) Date of Patent: Jun. 10, 2014

(54) HYBRID SADDLE-TYPE VEHICLE

(75) Inventors: Akifumi Nomura, Saitama (JP);
Kenichi Ohmori, Saitama (JP);
Kazuyuki Nakai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/581,195

(22) PCT Filed: Mar. 23, 2010

(86) PCT No.: PCT/JP2010/054966
§ 371 (c)(1),
(2), (4) Date: Aug. 24, 2012

(87) PCT Pub. No.: WO2011/117967
PCT Pub. Date: Sep. 29, 2011

(65) Prior Publication Data
US 2012/0325571 A1  Dec. 27, 2012

(51) Int. Cl.
*B60K 6/40* (2007.10)
*B62K 11/00* (2006.01)

(52) U.S. Cl.
USPC .......................................................... 180/220

(58) Field of Classification Search
USPC .................................................. 180/219, 220
See application file for complete search history.

(56) References Cited

U.S. PATENT DOCUMENTS

2007/0256873 A1 * 11/2007 Masuda et al. ................ 180/220
2009/0057046 A1    3/2009 Kofuji

FOREIGN PATENT DOCUMENTS

| CN | 1356235 A | 7/2002 | |
|---|---|---|---|
| EP | 2 340 953 A1 | 7/2011 | |
| JP | 8-175473 A | 7/1996 | |
| JP | 08175475 A  * | 7/1996 | ............ B62M 23/02 |
| JP | 3660466 B2 | 6/2005 | |
| JP | 2007-137192 A | 6/2007 | |
| JP | 2008-44588 A | 2/2008 | |
| JP | 3157836 U | 3/2010 | |
| JP | 2013067252 A  * | 4/2013 | |
| TW | 232240 | 10/1994 | |
| TW | 354960 | 3/1999 | |
| TW | I239712 B2 | 9/2005 | |
| TW | M377003 U1 | 3/2010 | |
| WO | 2009/047806 A2 | 4/2009 | |

* cited by examiner

*Primary Examiner* — Kevin Hurley
(74) *Attorney, Agent, or Firm* — Birch, Stewart, Kolasch & Birch, LLP (57) ABSTRACT

A hybrid saddle-type vehicle is provided with a power transmission mechanism for transmitting a power of an internal combustion engine to a drive shaft of a rear wheel from one side of a swing arm in a widthwise direction of a vehicle, and an electric motor disposed in the other side in the widthwise direction and for transmit a driving force from the other side in the widthwise direction. A motor housing of the electric motor is supported on an extension portion extending in the other side in the widthwise direction from a portion of the drive shaft to which the rear wheel is mounted, via a pair of bearing sections disposed on both sides of the motor housing in the widthwise direction. The rotor is rotatably supported by the drive shaft between the pair of the bearing sections.

20 Claims, 9 Drawing Sheets

HYBRID SADDLE-TYPE VEHICLE

TECHNICAL FIELD

The invention relates to a hybrid saddle-type vehicle.

BACKGROUND ART

A hybrid motorcycle including a forcedly-air-cooled engine and a drive motor and in which respective driving torques are appropriately selected and transmitted to a rear wheel has been proposed hitherto (for example, see Patent Document 1). The hybrid motorcycle disclosed in Patent Document 1 includes a transmission case equipped with a transmission mechanism for transmitting a driving force from an engine to the rear wheel. The transmission case is formed integrally with a crankcase of the engine, and is disposed on a left side of a vehicle body. Further, an electric motor is disposed back and forth in a horizontal direction at a right side of the vehicle body, and a motor case is supported to the crankcase through a bracket. The driving force of the engine is transmitted to an axle of the rear wheel via the transmission mechanism. By manually operating a switching lever, a driving force of the electric motor is transmitted to the axle of the rear wheel via a bevel gear, a speed reduction mechanism, and a power switching mechanism.

PRIOR ART DOCUMENT

Patent Document

[Patent Document 1] JP-B2-3660466

SUMMARY OF INVENTION

Problems to be Solved by the Inventions

The hybrid motorcycle disclosed in Patent Document 1 has a problem in that, since a large space is required at the right side of the vehicle body to install the bevel gear, the speed reduction mechanism, and the power switching mechanism which transmit the driving force of the electric motor, and a muffler in addition to the electric motor, a size or an output of the electric motor is limited in terms of layout. Further, there is another problem in that since the driving force of the electric motor is transmitted via a plurality of mechanism such as the bevel gear, the speed reduction mechanism, and the power switching mechanism, a mechanical loss occurs during transmitting the power.

The inventions have been made to solve the above-mentioned problems, and an object of the inventions is to provide a hybrid saddle-type vehicle which can dispose a driving mechanism for an electric motor in a compact size, improve the design freedom, and increase the output of the electric motor.

Means for Solving the Problems

In order to attain the above object, according to the invention of claim 1, a hybrid saddle-type vehicle includes a rear-wheel supporting member swingably attached to a body frame and adapted to support a rear wheel; a power transmission mechanism configured to transmit a power of an internal combustion engine to a drive shaft of the rear wheel from one side of the rear-wheel supporting member in a widthwise direction of a vehicle; and an electric motor configured to transmit a driving force to the drive shaft from the other side of the rear-wheel supporting member in the widthwise direction. The electric motor includes a motor housing that accommodates a stator and a rotor therein and is fixed to the rear-wheel supporting member. The motor housing is supported on an extension portion extending in the other side in the widthwise direction from a portion of the drive shaft to which the rear wheel is mounted, via a pair of bearing sections disposed on both sides of the motor housing in the widthwise direction. The rotor is rotatably supported by the drive shaft between the pair of the bearing sections.

According to the invention of claim 2, in addition to the configurations of claim 1, the rear-wheel supporting member is a swing arm swingably supported on the body frame via a pivot shaft.

According to the invention of claim 3, in addition to the configurations of claim 2, the motor housing is disposed rearward of the pivot shaft and inward of an end portion of the pivot shaft.

According to the invention of claim 4, in addition to the configurations of claim 2 or 3, a connection member connecting the motor housing and the swing arm is disposed upward of a bottom surface of the swing arm.

According to the invention of claim 5, in addition to the configurations of any one of claims 1 to 4, the swing arm includes a first arm portion extending from one side of a support portion supporting the pivot shaft in the widthwise direction to a lateral side of the rear wheel, a second arm portion extending from the other side of the support portion in the widthwise direction to a forward of the rear wheel, and a cross portion connecting a rear portion of the second arm portion and the first arm portion, and the connection member connecting the motor housing and the swing arm is connected to the rear portion of the second arm portion from which the cross portion extends.

According to the invention of claim 6, in addition to the configurations of claim 1, the rear-wheel supporting member is a unit swing case which is swingably supported on the body frame via a link mechanism and covers the internal combustion engine.

According to the invention of claim 7, in addition to the configurations of any one of claims 1 to 6, the drive shaft is provided therein with an axial passage extending in an axial direction from the other end portion thereof, and a radial passage extending in a radial direction from the axial passage and opened near the bearing section which is positioned at an intermediate portion of the drive shaft, and the motor housing is provided with ribs adapted to supply splash oil scattered in the motor housing to the axial passage.

According to the invention of claim 8, in addition to the configurations of any one of claims 1 to 6, the rear wheel of the rear wheel includes a wheel hub portion having an inner cylindrical hub provided at the drive shaft and an outer cylindrical hub provided radially outward of the inner hub, and at least a part of the bearing section supporting the motor housing at a side of the power transmission mechanism is disposed to overlap the outer hub in the widthwise direction.

According to the invention of claim 9, in addition to the configurations of any one of claims 1 to 8, the electric motor further includes a speed reduction mechanism that decelerates the driving force and transmits it to the drive shaft, and the rotor is rotatably supported around the drive shaft, and the speed reduction mechanism is disposed on the other side of the drive shaft in the widthwise direction.

Advantage of the Inventions

In accordance with the invention of claim 1, since the motor housing is supported by the extension portion extending from the portion, to which the rear wheel is mounted, of the drive shaft in the other side of the widthwise direction of the vehicle via the pair of bearing sections disposed on both sides thereon in the widthwise direction of the vehicle, the electric motor can be directly supported by the drive shaft secured with the strength, and thus the power transmission mechanism can be configured without being necessary for the bevel gear or the speed reduction mechanism. Further, since the rotor is supported by the drive shaft between the pair of bearing sections at both sides of the motor housing, the heavy rotor can be reliably supported by the drive shaft in a long span. Furthermore, the driving mechanism for the electric motor can be compact in size, and the design freedom of the electric motor can be improved as much as the size becomes compact. In addition to this, the driving force of the electric motor can be transmitted to the drive shaft of the rear wheel without passing through a plurality of transmission mechanisms, thereby suppressing the power loss in the transmission to a minimum.

In accordance with the invention of claim 2, since the rear-wheel supporting member is swingably supported on the body frame via the pivot shaft, it is possible to incorporate the electric motor into the swing arm in the hybrid saddle-type vehicle including the swing arm.

In accordance with the invention of the claim 3, since the motor housing is disposed rather rearward than the pivot shaft of the swing arm and rather inward than the end portion of the pivot shaft, the electric motor does not protrude from the vehicle, but is disposed in compact.

In accordance with the invention of claim 4, since connection member connecting the motor housing and the swing arm is disposed rather upward than the bottom surface of the swing arm, a minimum height-above-a-ground is not determined by the connection member, but the height of the swing arm from the ground can be set to the minimum height-above-a-ground, such like the related art.

In accordance with the invention of claim 5, the swing arm includes the first arm portion extending from the support portion, which is supported by the pivot shaft, to the lateral side of the rear wheel, the second arm portion extending to the forward of the rear wheel, and the cross portion, and the connection member connecting the motor housing and the swing arm is connected to the rear portion of the second arm portion. Therefore, the rear wheel can be supported in the double-sided structure having high rigidity, and distortion of the swing arm can be prevented, thereby securing the safety of driving.

In accordance with the invention of claim 6, since the rear-wheel supporting member is the unit swing case which is swingably supported on the body frame via the link mechanism and covers the internal combustion engine, it is possible to incorporate the electric motor into the unit swing case in the hybrid saddle-type vehicle including the unit swing case.

In accordance with the invention of claim 7, the drive shaft includes the axial passage and the radial passage opened near the bearing section, and the motor housing includes the ribs for collecting the splash oil scattered in the motor housing. Therefore, it is possible to effectively collect the splash oil scattered in the motor housing and supply it to the bearing sections to lubricate the bearing sections.

In accordance with the invention of claim 8, since at least a portion of the bearing section supporting the power transmission mechanism side of the motor housing is disposed to overlap the outer hub of the wheel in the widthwise direction of the vehicle, the bearing section can be disposed near the center portion of the vehicle body, thereby suppressing the vibration of the drive shaft.

In accordance with the invention of claim 9, since the rotor is rotatably supported by the drive shaft, and the rotation of the rotor is decelerated by the speed reduction mechanism disposed outside the drive shaft in the widthwise direction of the vehicle and is then transmitted to the drive shaft, the heavy rotor can be disposed on the center portion of the drive shaft, thereby suppressing the vibration of the drive shaft.

DESCRIPTION OF EMBODIMENTS

A hybrid saddle-type vehicle according to each embodiment of the inventions will now be described with reference to the accompanying drawings. The drawings should be viewed in a position that permits a proper reading of the reference numbers included in the respective drawings.

First Embodiment

Figure 1:
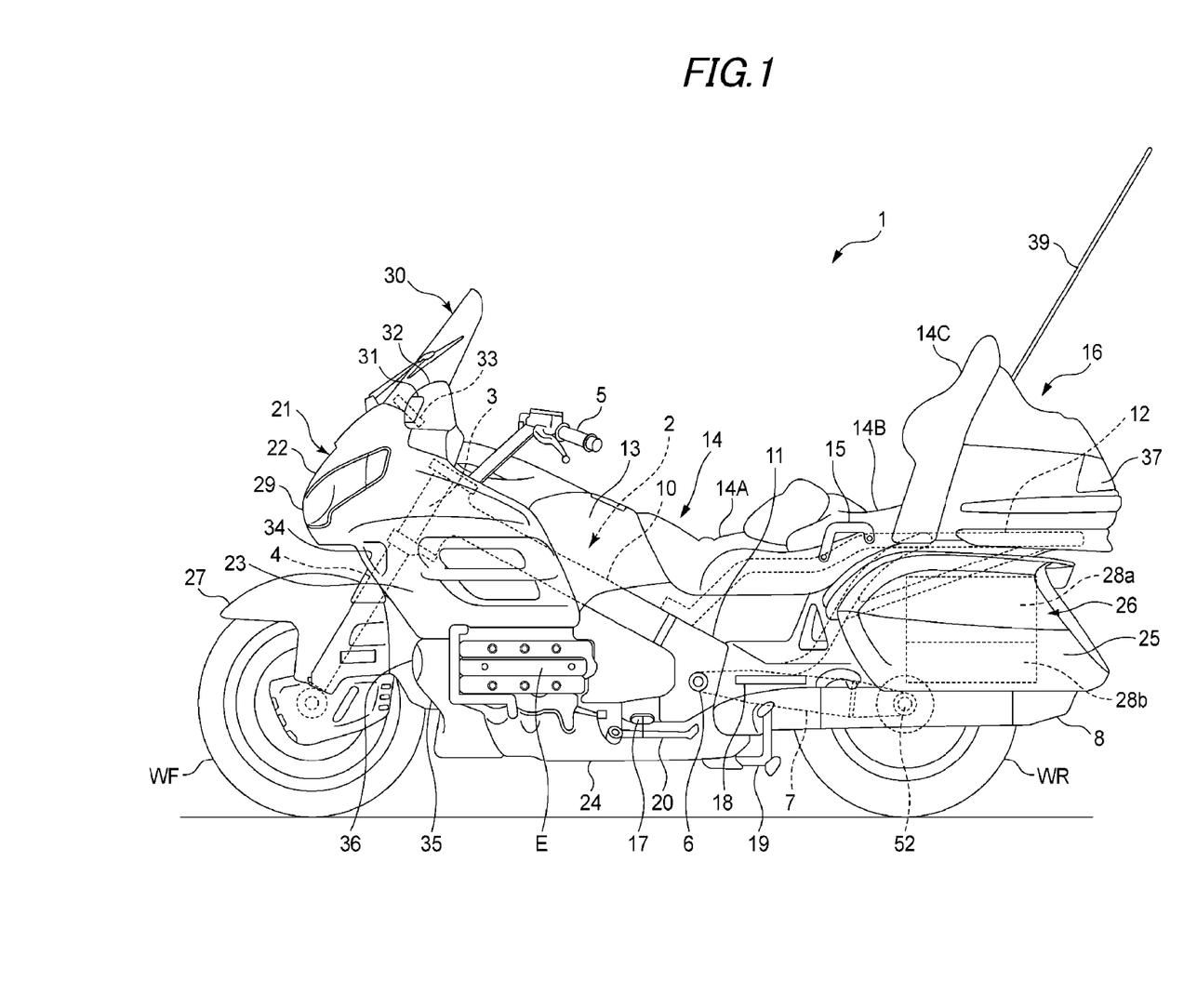
FIG. 1 is a side view illustrating a hybrid saddle-type vehicle according to a first embodiment of the inventions.
Figure 2:
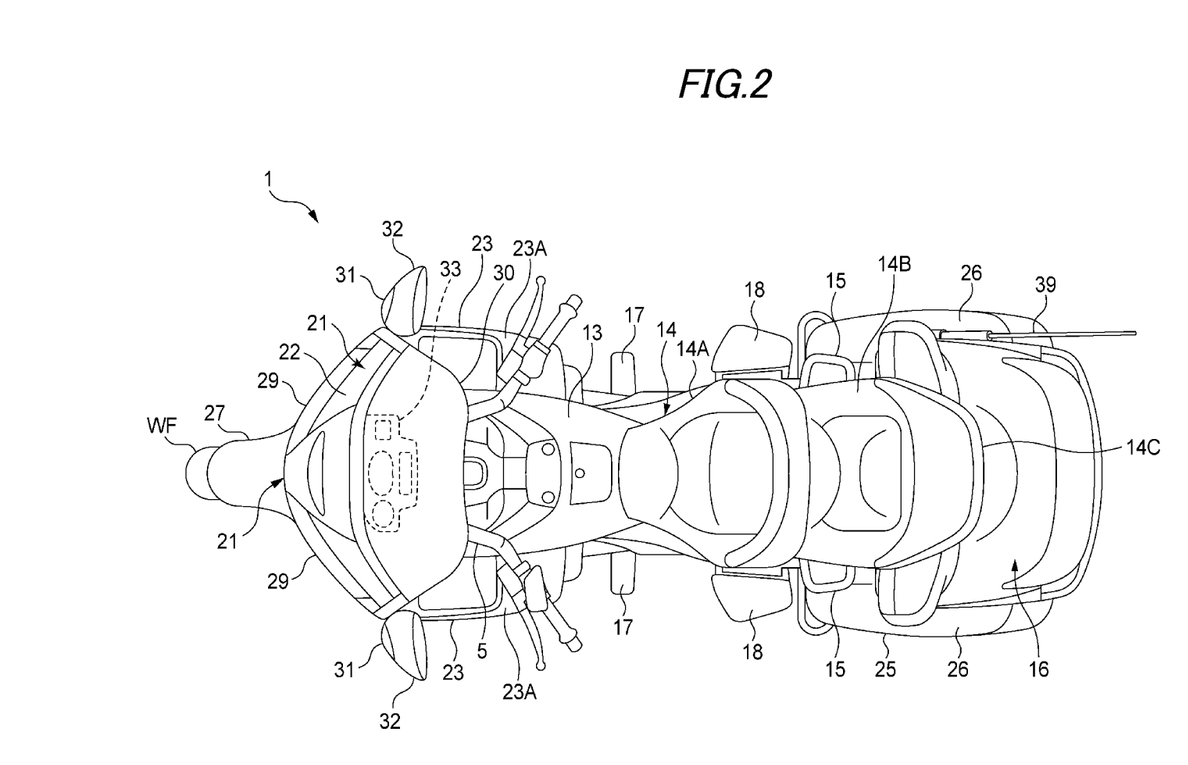
FIG. 2 is a plan view of the hybrid saddle-type vehicle illustrated in FIG. 1.

FIG. 1 is a side view illustrating the whole configuration of a hybrid saddle-type vehicle according to a first embodiment of the inventions, and FIG. 2 is a plan view of the hybrid saddle-type vehicle.

As illustrated in FIGS. 1 and 2, a large motorcycle 1 which is a hybrid saddle-type vehicle according to this embodiment, includes a body frame 2, a head pipe 3 fixed to a front end portion of the body frame 2, a front fork 4 pivotally mounted to the head pipe 3, a front wheel WF rotatably mounted to a lower end portion of the front fork 4, a steering handle 5 mounted to an upper end portion of the front fork 4, an engine (internal combustion engine) E positioned below a front portion of the body frame 2 and extending at a position rather rearward than the front fork 4, a swing arm 7 (rear-wheel supporting member) mounted swingably in an up-down direction to a pivot shaft 6 which is provided to a rear bottom portion of the body frame 2, a rear wheel WR rotatably mounted to a swing end portion of the swing arm 7, an exhaust muffler 8 connected to the engine E via an exhaust pipe (not illustrated), and a rear cushion 9 (see FIG. 3) disposed between the swing arm 7 and the body frame 2.

The body frame 2 includes a pair of left and right main frames 10 branched in a right and left direction from the head pipe 3s and extending backward and obliquely downward, a pair of left and right pivot plates 11 connected to a rear portion of the main frame 10, and a pair of left and right seat rails 12 extending backward and obliquely upwardly from front and rear portions of the pivot plate. The engine E is supported below the main frame 10, and a fuel tank 13 is supported above the main frame 10. Further, an occupant's seat 14 is attached to the upper portion of the seat rail 12, and a grab rail 15 and a trunk box 16 are attached to the rear portion of the seat rail 12.

The occupant's seat 14 includes a front seat 14A extending to a rear portion of the fuel tank 13, on which a rider sits, a rear seat 14B formed higher by one step than the front seat 14A at the rear portion of the front seat 14A, on which a pillion passenger sits, and a backrest 14C for the occupant. Further, the pivot plate 11 of the body frame 2 is attached with a pair of left and right steps (rider's foot-placed steps) 17 for the rider sitting on the front seat 14A, and with a pair of left and right steps (pillion passenger's foot-placed steps) 18 for the pillion passenger sitting on the rear seat 14B. In addition, a main stand 19, a sub stand 20, a body cowling 21 which will be described later, and others are attached to the body frame 2.

The body cowling 21 includes a front fairing 22 covering the vehicle body, a pair of left and right side covers 23 covering the lateral portions of the vehicle body, an undercover 24 covering the lower portion of the vehicle body, and a rear seat cowl 25 covering the rear portion of the vehicle body. The rear seat cowl 25 is formed integrally with a pair of left and right saddlebags 26. A front fender 27 is attached to the front fork 4 to cover the front wheel WF. A rear fender (not illustrated) is attached to the rear seat cowl 44 to cover the rear wheel WR. Meanwhile, the front fairing 22 and the pair of left and right side covers 23 may be formed in one piece. Further, one of the saddlebags 26 is received with a PDU (power drive unit) 28a and a battery 28b.

Headlights 29 are provided on the front surface of the front fairing 22, and a windscreen (windshield) 30 is attached above the headlights. Left and right mirrors 32 each incorporating a front blinker 31 are respectively provided at the left and right ends of the front fairing 22. As illustrated in FIG. 2, vehicle meters 33 are disposed inside the front fairing 22. The side covers 23 are respectively provided with a pair of left and right air openings 34 adapted to supply outside air from the front of the vehicle to the surrounding of the engine E. An engine guard 35 is provided at left-forward of and right-forward portions of the engine E, and a pair of left and right fog lamps 36 are attached to the engine guard 35.

The side covers 23 are attached with a pair of left and right upper covers (exterior cover) 23A (see FIG. 2) covering between the side cover 23 and the main frame 10 and exposed from the exterior. The side upper covers 23A interrupt the heat generated from the engine E from flowing to the passenger side via a gap between the side covers 23 and the body frame 2. The side upper covers 23A also serve as a decorative cover covering the upper portion of a radiator (not illustrated). Further, a pair of left and right tail lamp units 37 is disposed on a rear surface of the trunk box 16, and a rear blinker (not illustrated) is disposed on a rear surface of the respective saddlebags 26. A right portion of the trunk box 16 is attached with a road antenna 39 used when an audio unit (not illustrated) incorporated in the large motorcycle 1 receives a radio broadcast.

Figure 3:
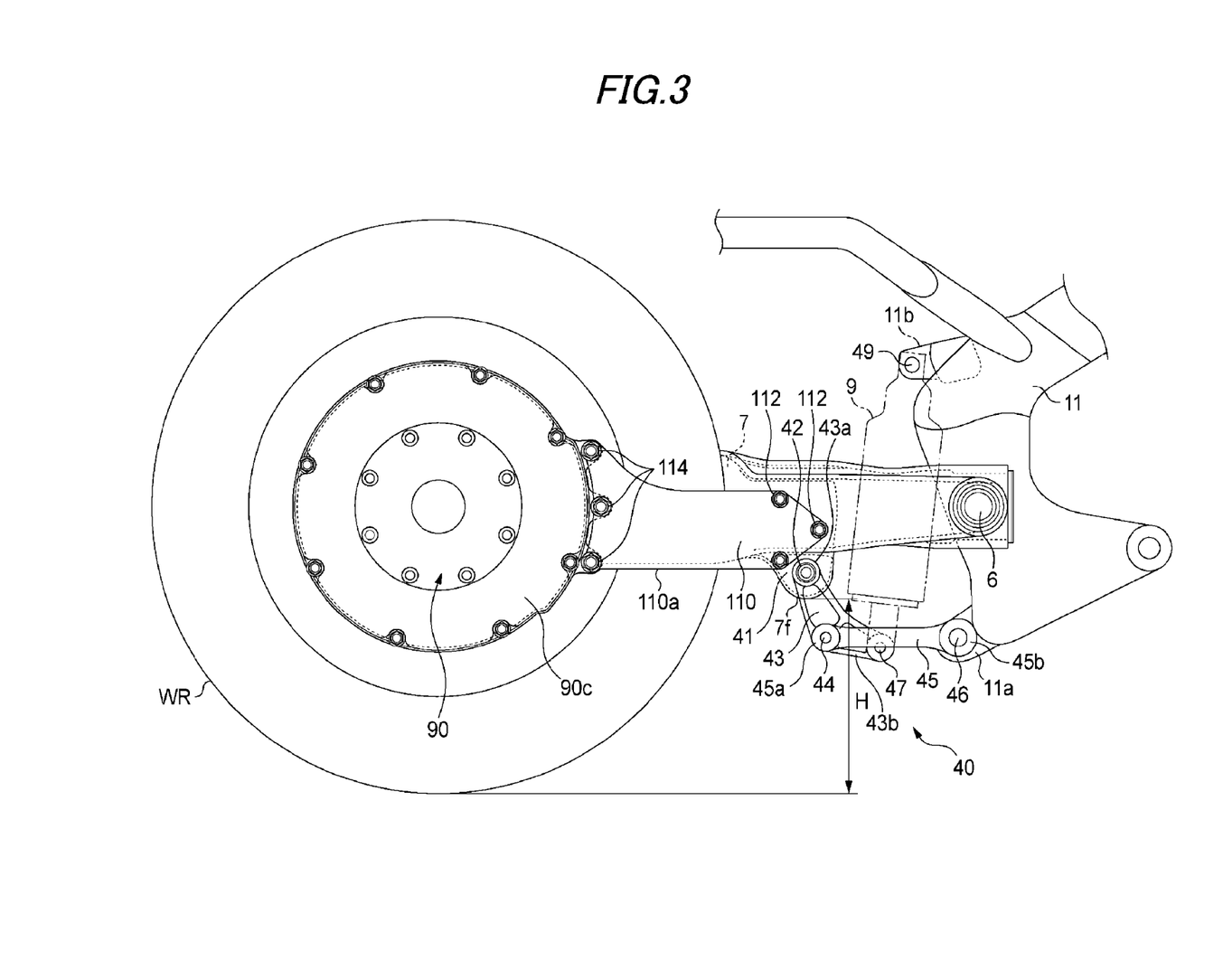
FIG. 3 is a right side view illustrating a rear wheel supported by a swing arm in FIG. 1.

A suspension link 40 includes, as illustrated in FIG. 3, a first link 43 connected to a stay 41 at one end portion 43a thereof by a shaft 42, and a second link 45 having one end 45a connected to an intermediate portion of the first link 43 by a shaft 44, and the other end 45b connected to a lower end portion 11a of the pivot plate 11 by a shaft 46. The other end 43b of the first link 43 is connected to an upper end portion 11b of the pivot plate 11 by a shaft 49. The rear cushion 9 penetrates a space 50 (see FIG. 4) formed at the front side of the swing arm 7.

Figure 4:
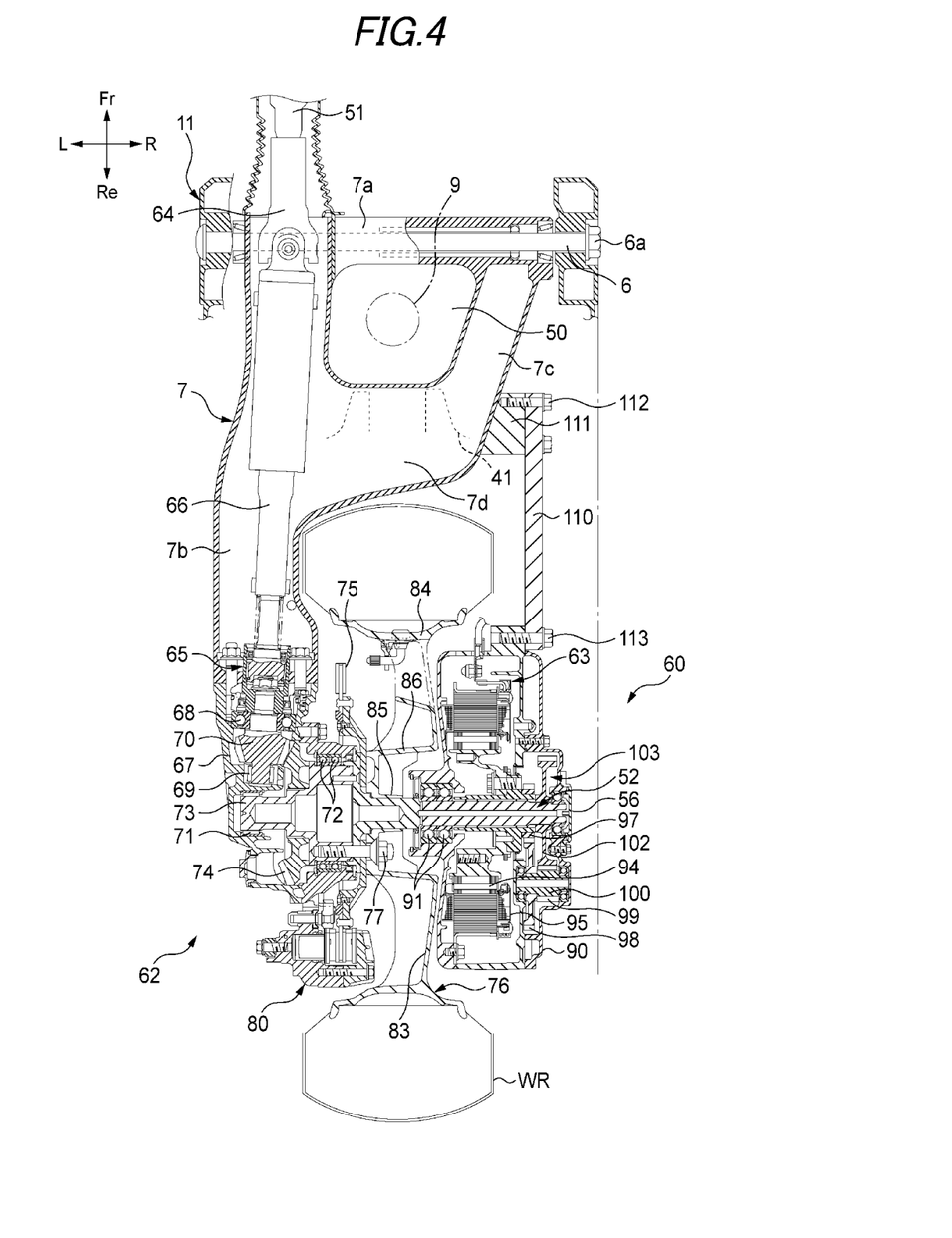
FIG. 4 is a partial cutaway view illustrating a rear-wheel driving mechanism in FIG. 1.

As illustrated in FIG. 4, the swing arm 7 is formed integrally with a support portion 7a pivotally around the pivot plate 11 through the pivot shaft 6, a first arm portion 7b extending from one side (left side in FIG. 4) of the support portion 7a in a widthwise direction of the vehicle to a lateral side of the rear wheel WR, a second arm portion 7c extending from the other side (right side in FIG. 4) of the support portion 7a in the widthwise direction of the vehicle to the forward of the rear wheel WR, and a cross portion 7d connecting the rear portion of the second arm portion 7c and the intermediate portion of the first arm portion 7b in the widthwise direction of the vehicle. The swing arm 7 is hollow, and a drive shaft 66 which will be described later is accommodated in the first arm portion 7b, and passes above the support portion 7a to be connected to the output shaft 51.

Figure 5:
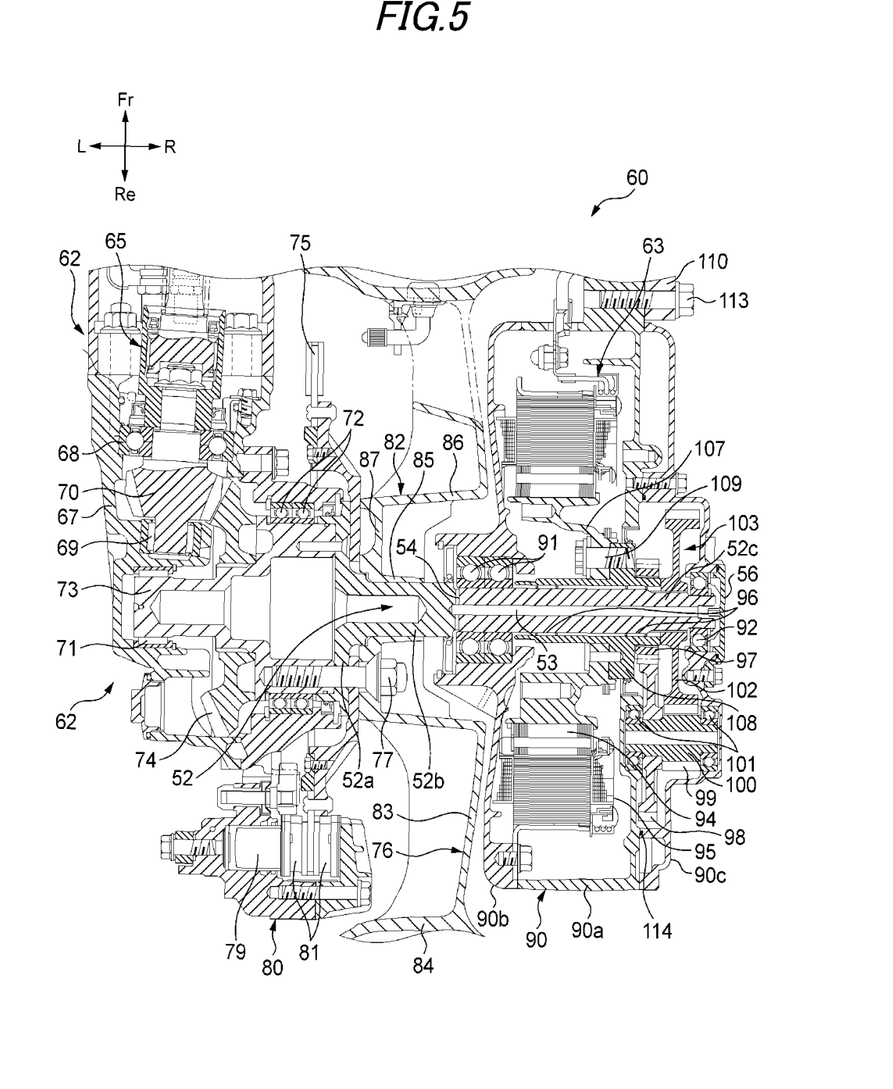
FIG. 5 is an enlarged view of a major portion of FIG. 4.

Next, the driving mechanism for the rear wheel WR will be described with reference to FIGS. 4 to 6. The driving mechanism 60 includes a power transmission mechanism 62 for transmitting the power of the engine E from one side of the swing arm 7 in the widthwise direction of the vehicle to the drive shaft 52 of the rear wheel WR which will be described, and an electric motor 63 for transmitting the driving force from the other side of the swing arm 7 in the widthwise direction of the vehicle to the drive shaft 52.

The power transmission mechanism 62 a drive shaft 66 having a front end portion connected to the output shaft 51 of the engine E through a universal joint 64 and a rear end portion provided with a constant velocity joint 67, a drive bevel gear 70 rotatably supported on the gear case 67 by a ball bearing 68 and a needle bearing 69, and a driven bevel gear 74 spline-fitted to a gear shaft 73 which is rotatably supported on the gear case 67 by the needle bearing 71 and a pair of ball bearings 72, and meshed with the drive bevel gear 70.

The gear shaft 73 is fastened and fixed integrally with a flange portion 52a formed on one side of the drive shaft in the widthwise direction of the vehicle, with the rear wheel WR being attached to the drive shaft 52, a disc-shaped brake disc 75, and a real wheel 76 of the rear wheel WR by a bolt 77. In this way, the driving force of the power transmission mechanism 62 is transmitted to the drive shaft 52.

A disc brake device 80 is disposed on an outer lateral side of the brake disc 75, and has a pair of brake pads 81 driven by a hydraulic cylinder 79 to pinch the brake disc 75.

The rear wheel 76 includes a wheel hub portion 82, a spoke portion 83 extending substantially radially outward from the wheel hub portion 82, and a rim portion 84 provided at a front end of the spoke portion 83 and holding the rear wheel WR. The wheel hub portion 82 has an inner cylindrical hub 85 fitted in the drive shaft 52, an outer hub 86 provided rather radially outward than the inner hub 85, and a sidewall 87 integrally connecting the inner hub 85 and an outer hub 86.

The electric motor 63 is disposed on the other side (right side in FIG. 4) of the swing arm 7 in the widthwise direction of the vehicle, and transmits the driving force to the drive shaft 52 of the rear wheel WR. Further, the electric motor 63 is rotatably supported on an extension portion 52c extending from one portion 52b of the drive shaft 52, to which the rear wheel 76 is mounted, to the other portion 52c in the widthwise direction of the vehicle, via a pair of bearing sections disposed on both ends of the motor housing 90 in an axial direction thereof, that is, one ball bearings 91 and 91 and the other ball bearing 92.

A rotor sleeve 108 is positioned on the drive shaft 52 at a substantially center portion between the one ball bearings 91 and 91 and the other ball bearing 92, and is rotatably supported by a pair of needle bearings 96 at both ends thereof. A rotor core 107 of the rotor 94 is fastened to the rotor sleeve 108 by a bolt 109. A stator 95 is fixed to the motor housing 90 at an outer peripheral side of the rotor 94, with a slight gap being between the stator and the motor housing in a radial direction.

The motor housing 90 includes a housing body 90a, inner and outer housing covers 90b and 90c each fastened to the housing body 90a, and a lid 56 for covering an opening portion 90d provided in the outer housing cover 90c. The motor housing 90 is disposed farther rearward than the pivot shaft 6, and also farther inward than an end portion 6a of the pivot shaft 6 (see FIG. 4).

A drive gear 97 is fixed to the other side of the rotor sleeve 108 in the widthwise direction of the vehicle in a spline fitting manner. Further, an intermediate shaft 100 is rotatably supported between the housing body 90a and the outer housing cover 90c via a pair of ball bearings 101, and is provided with a large gear 98 and a small gear 99. The large gear 98 of the intermediate shaft 100 is meshed with a drive gear 97, and the small gear 99 of the intermediate shaft 100 is meshed with a driven gear 102 provided on the drive shaft 52. The drive gear 97, the large gear 98, the small gear 99, and the driven gear 102 configures the speed reduction mechanism 103, and the rotation of the rotor 94 is transmitted to the drive shaft 52 via the speed reduction mechanism 103 (the drive gear 97, the large gear 98, the small gear 99, and the driven gear 102). The contact surface between the housing body 90a and the outer housing cover 90c which defines a space for accommodating the speed reduction mechanism 103 therein is provided with an O-ring 114 for sealing the space.

The drive shaft 52 is provided with an axial passage 53 extending in an axial direction from the other end portion thereof and passing the axis, and a radial passage 54 communicating with the axial passage 53 and extending in a radial direction. The radial passage 54 is opened near the one ball bearings 91 and 91 which are positioned at the intermediate portion of the drive shaft 52. The opening portion 90d provided in the outer housing cover 90c which corresponds to the other side of the drive shaft 52 in the widthwise direction of the vehicle is closed by the lid fixed by the bolt 58, with an O-ring 57 being interposed between the lid and the opening portion (see FIGS. 6 and 7).

Figure 6:
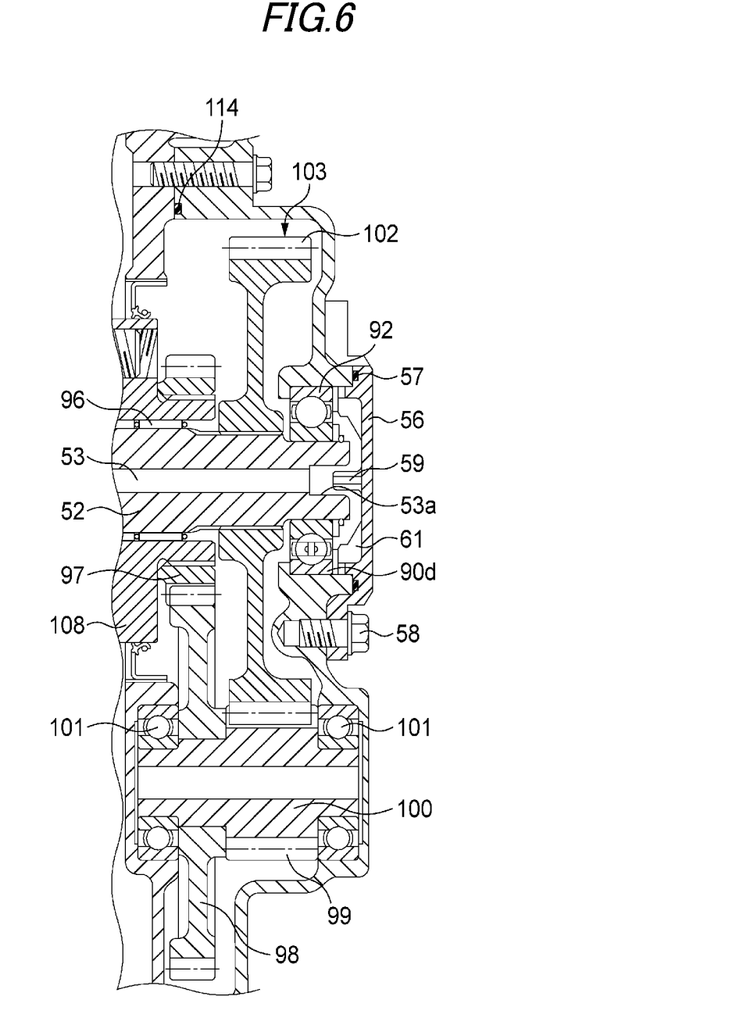
FIG. 6 is an enlarged view of a major portion of FIG. 5.
Figure 7:
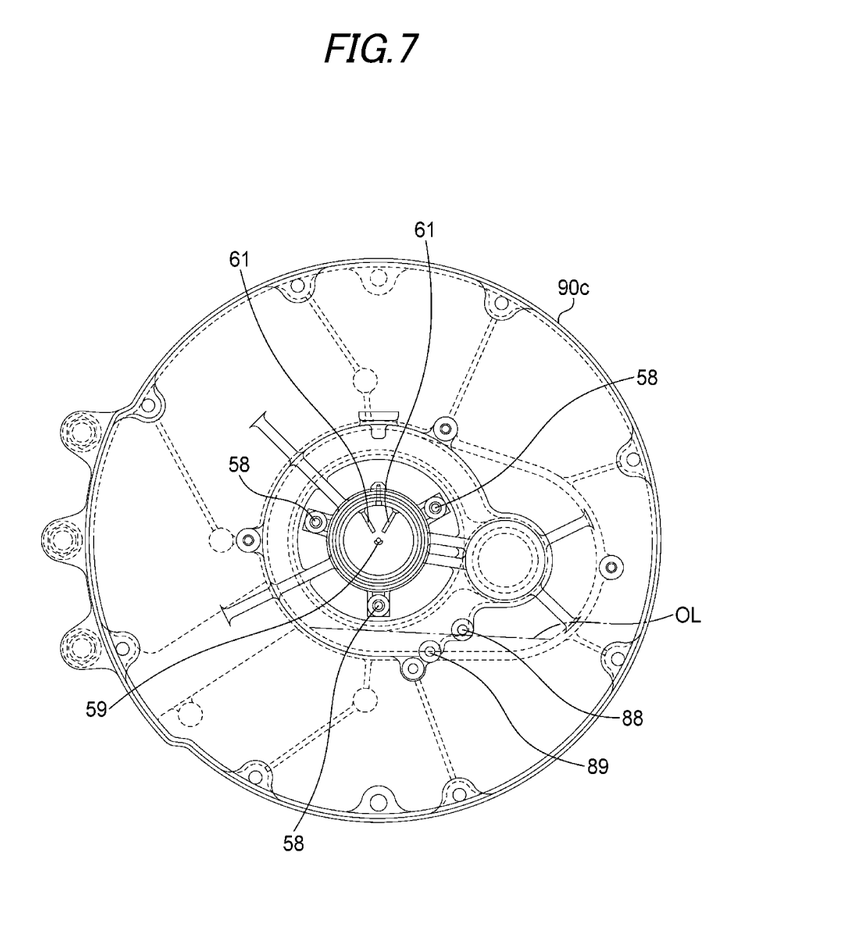
FIG. 7 is a side view of a motor end cover when seen from an inside.

As illustrated in FIGS. 6 and 7, the inner surface of the lid 56 is provided with a gutter-shaped oil introducing rib 59, which is convex downward, at a position opposite to the axial passage 53 of the driving shaft 52. The oil introducing rib 59 is inserted into a radially enlarged open end portion 53a of the axial passage 53. Further, a plurality of oil collecting ribs 61 are formed above the oil introducing rib 59. The oil collecting ribs 61 are formed to extend radially and obliquely upwardly with the oil introducing rib 59 as the center, above the oil introducing rib 59. In this way, splash oil, that moves up with the rotation of the speed reduction mechanism 103 (the drive gear 97, the large gear 98, the small gear 99, and the driven gear 102) and scatters in the motor housing 90, is collected by the oil collecting ribs 61. The collected oil is supplied to the ball bearings 91 and 91 positioned at the intermediate portion of the drive shaft 52 through the opening end 53a, the axial passage 53, and the radial passage 54 from the oil introducing rib 59 to lubricate the ball bearings. Meanwhile, the oil collecting ribs 61 are two in this embodiment, but any number of oil collecting ribs may be provided.

As illustrated in FIG. 7, the outer housing cover 90c is provided with an oil check hole 88 and an oil drain hole 89 at an angle in a rear lower portion thereof, and an oil check bolt and an oil drain bolt are screwed to each hole 88 and 89 to clog the holes. The oil check hole 88 is to check whether an oil level OL of the oil retained in the motor housing 90 reaches the lower surface of the oil check hole 88, specifically, a height in which the oil is scraped by a toothed surface of the driven gear 102. Further, the oil drain hole 89 is to discharge the used oil O at the time of oil exchange.

In the electric motor 63 having the above configuration, the one ball bearings 91 and 91 fitted in the inner housing cover 90b are pressed onto a drive shaft 144. Next, the stator 95 is fastened and fixed to the inner housing cover 90b, and the rotor 94, the rotor core 107, the rotor sleeve 108, and the drive gear 97, which are unitized, are attached to the drive shaft 144 by pressing the needle bearing 96, which is fitted in the rotor sleeve 108, onto the needle bearing 96. After the housing body 90a is attached to the inner housing cover 90b, the ball bearing 101, the large gear 98, and the intermediate shaft 100 are incorporated in the housing body 90a, and the driven gear 102 are spline-fitted in the drive shaft 52. Then, after the other ball bearing is pressed onto the drive shaft 52, the outer housing cover 90c is fastened and fixed to the housing body 90a, and the lid 56 is fastened and fixed to the outer housing cover 90c.

Further, one end portion of a connection member 110 extending in the front and rear direction is fastened to the motor housing 90 by a bolt 113. Specifically, one end portion of the connection member 110 is fastened to the housing body 90a at the front of the outer housing cover 90c. The other end portion of the connection member 110 is coupled to a connection boss 111 extending from the rear portion of the second arm portion 7c of the swing arm 7, more specifically, from the cross portion 7d to the other side in the widthwise direction of the vehicle, by a bolt 112. In this way, the motor housing 90 is fixed to the swing arm 7 via the connection member 110, and the rear wheel WR is supported in a double-sided support structure by the first arm portion 7b of the swing arm 7 in one side of the widthwise direction of the vehicle, and the connection member 110 connected to the swing arm 7. Furthermore, a bottom surface 110a of the connection member 110 is positioned higher than a bottom surface 7f of the swing arm 7 (see FIG. 3).

With the large motorcycle 1 including the above configuration, the driving force of the engine E is transmitted to the rear wheel WR via the drive shaft 66, the drive bevel gear 70, the driven bevel gear 74, the gear shaft 73, the drive shaft 52, and the rear wheel 76. Further, the driving force of the electric motor 63 is transmitted to the rear wheel WR via the drive gear 97 connected to the rotor sleeve 108, the large gear 98, the small gear 99, the driven gear 102, the drive shaft 52, and the rear wheel 76. Furthermore, if the driving force is transmitted from the driving wheel side at the time of deceleration of the vehicle, the electric motor 63 serves as a generator to generate a so-called regenerative braking force and recover kinetic energy of the vehicle as regenerative energy.

As described above, with the hybrid saddle-type vehicle 1 according to this embodiment, since the motor housing 90 is supported by the extension portion 52c extending from the portion 52b, to which the rear wheel WR is mounted, of the drive shaft 52 in the other side of the widthwise direction of the vehicle via the pair of bearing sections 91, 91 and 92 disposed on both sides thereon in the widthwise direction of the vehicle, the electric motor 63 can be directly supported by the drive shaft 52 secured with the strength, and thus the power transmission mechanism can be configured without being necessary for the bevel gear or the speed reduction mechanism. Further, since the rotor 94 is supported by the drive shaft 52 between the pair of bearing sections 91, 91 and 92 at both sides of the motor housing 90, the heavy rotor 94 can be reliably supported by the drive shaft 52 in a long span. Furthermore, the driving mechanism for the electric motor 63 can be compact in size, and the design freedom of the electric motor 63 can be improved as much as the size becomes compact. In addition to this, the driving force of the electric motor 63 can be transmitted to the drive shaft 52 of the rear wheel WR without passing through a plurality of transmission mechanisms, thereby suppressing the power loss in the transmission to a minimum.

Also, since the rear-wheel supporting member is swingably supported on the body frame 2 via the pivot shaft 6, it is possible to incorporate the electric motor 63 into the swing arm 7 in the hybrid saddle-type vehicle 1 including the swing arm 7.

Since the motor housing 90 is disposed rather rearward than the pivot shaft 6 of the swing arm 7 and rather inward than the end portion 6a of the pivot shaft 6, the electric motor 63 does not protrude from the vehicle 1, but is disposed in compact.

Further, since connection member 110 is disposed rather upward than the bottom surface 7f of the swing arm 7, a height-above-the-ground of the swing arm 7 can be set to a minimum height-above-the-ground H.

The swing arm 7 includes the first arm portion 7b extending from the support portion 7a, which is supported by the pivot shaft 6, to the lateral side of the rear wheel WR, the second arm portion 7c extending to the forward of the rear wheel WR, and the cross portion 7d, and the motor housing 90 and the swing arm 7 are connected to each other by the connection member 110. As a result, the rear wheel WR is supported in the double-sided structure, thereby preventing distortion of the swing arm 7.

The motor housing 90 includes the gutter-shaped oil introducing rib 59 and the oil collecting ribs 61 to collect the splash oil scattered in the inside thereof, and the drive shaft 52 includes the axial passage 53 and the radial passage 54 opened near the bearing section 91. Therefore, it is possible to effectively collect the splash oil scattered in the motor housing 90 and supply it to the bearing sections 91 and 91 to lubricate the bearing sections.

Further, since at least a portion of the bearing sections 91 and 91 supporting the power transmission mechanism side of the motor housing 90 is disposed to overlap the outer hub 86 of the rear wheel 76 in the widthwise direction of the vehicle, the bearing sections 91 and 91 are disposed near the center portion of the vehicle body, thereby suppressing the vibration of the drive shaft 52.

The rotor 94 is rotatably supported by the drive shaft 52, and the rotation of the rotor 94 is decelerated by the speed reduction mechanism 103 disposed outside the drive shaft in the widthwise direction of the vehicle, and then is transmitted to the drive shaft 52. As a result, the large heavy rotor 94 can be disposed between the pair of bearing sections 91 and 92, thereby suppressing the vibration of the drive shaft 52.

Second Embodiment

Figure 8:
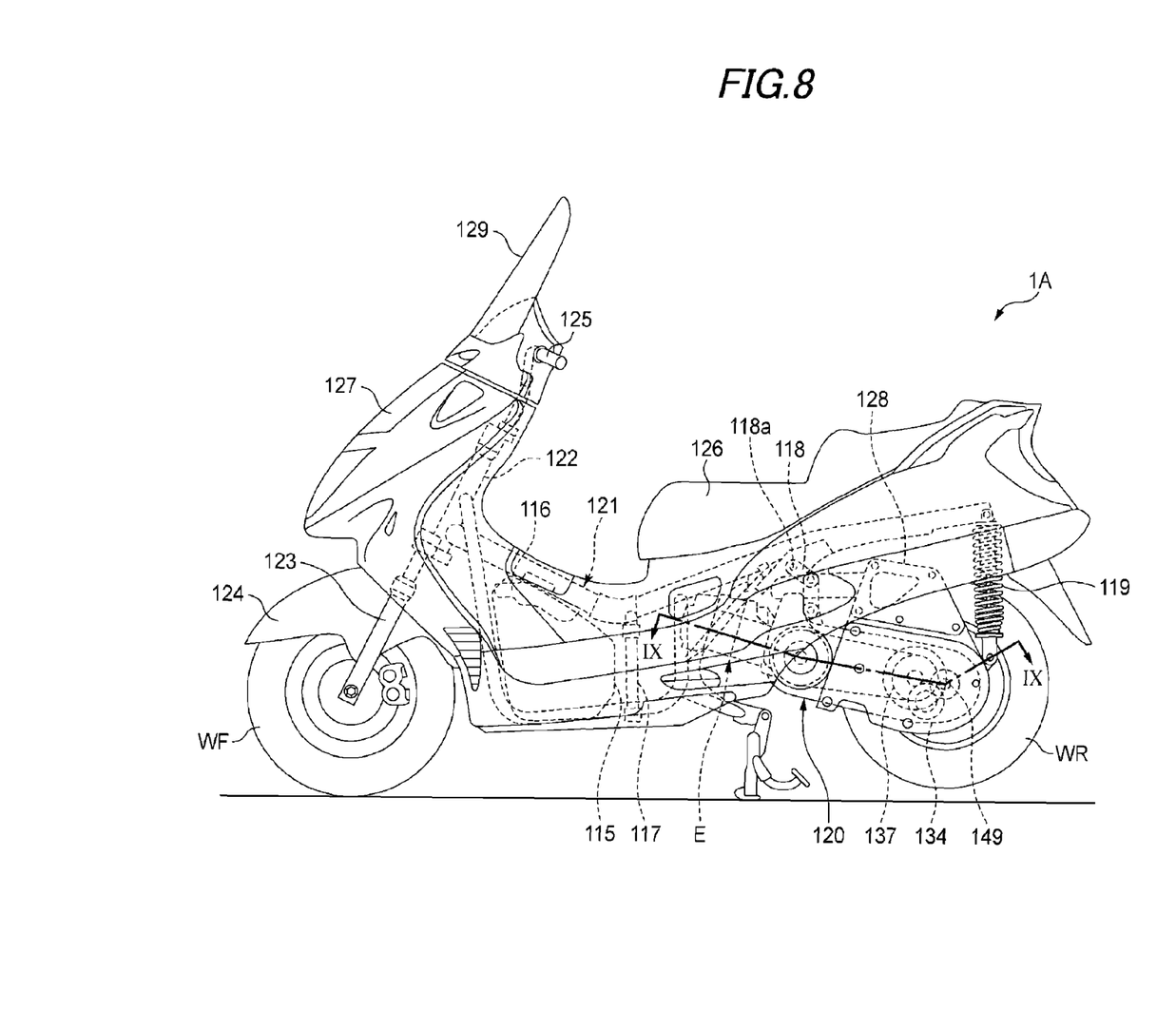
FIG. 8 is a side view illustrating a hybrid saddle-type vehicle according to a second embodiment of the inventions.

Next, a hybrid saddle-type vehicle according to a second embodiment of the inventions will be described with reference to FIGS. 8 and 9. The same reference numerals have been used to identify the same or similar elements as those of the first embodiment, and the description thereof will be omitted or in brief herein.

The hybrid saddle-type vehicle of this embodiment is a scooter type motorcycle 1A including a unit swing type internal combustion engine (hereinafter, referred to as a power unit) 120. As illustrated in FIG. 8, the scooter motorcycle 1A includes a cradle type body frame 121, a front fork 123 pivotally mounted to a head pipe 122 of the body frame 121, a front wheel WF and a front fender 124 which are attached to a lower end portion of the front fork 123, a handle 125 connected to an upper end portion of the front fork 123, a fuel tank 115 disposed in a cradle space enclosed by each frame of the body frame 121, a reserve tank 116 for a radiator, a radiator 117, a power unit 120 disposed at the rearward of the cradle space and having an engine and a power transmission mechanism 130, a link mechanism 118 for suspending a rear end portion of the power unit 120 from the body frame 121, a rear cushion 119 for suspending a rear end portion of the power unit 120 from the body frame 121, a rear wheel WR attached to a rear portion of the power unit 120, a seat 126 disposed on an upper portion of the body frame 121, and a cover 127 extending from a front portion of the body frame 121 to a rear portion over the whole length to cover desired portions of the vehicle including upper and lower surfaces, front and rear surfaces, and left and right lateral surfaces.

The portion of the cover 127 extending from the center portion of the vehicle to the rear portion covers the engine E of the power unit 120, and a portion of an air cleaner 128, and is elongated rearward and obliquely upwardly. The front end portion of the cover 127 is provided with a windscreen 129 which covers the forward of the handle 125.

Figure 9:
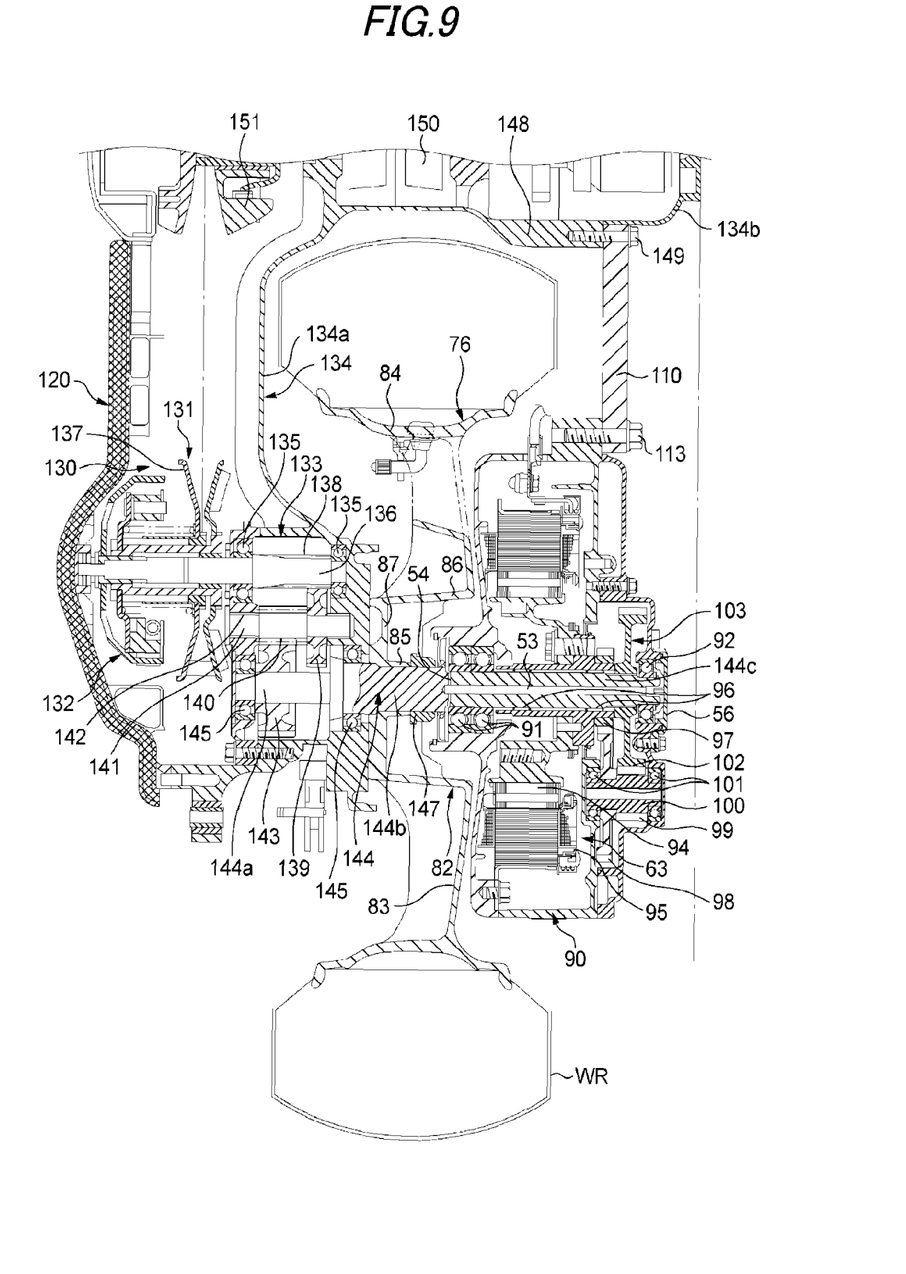
FIG. 9 is a cross-sectional view taken along the line IX-IX in FIG. 8.

As illustrated in FIG. 9, the power unit 120 is disposed on one side (right side in FIG. 9) of the scooter type motorcycle in a widthwise direction of the vehicle, and transmits the power from the engine E to a drive shaft 144 of the rear wheel WR. Further, an electric motor 63 is disposed on the other side (right side in FIG. 9) of the rear wheel WR in the widthwise direction of the vehicle to transmit the driving force to the rear wheel WR.

The power unit 120 includes the engine E and a power transmission mechanism 130 for transmitting the output of the engine E to the rear wheel WR. The engine E is an overhead cam (OHC) internal combustion engine, and if a piston reciprocates in a cylinder, the reciprocating movement is converted into a rotational movement of a crank shaft 150 via a connecting rod. A left end of the crank shaft 150 is connected to a drive-side pulley 151 of a V-belt automatic transmission 131.

The power transmission mechanism 130 includes the V-belt automatic transmission 131, a centrifugal clutch 132, and a gear reduction device 133. A unit swing case 134 includes a transmission case unit 134a accommodating the above components of the power transmission mechanism therein, and a crankcase portion 134b covering a connecting rod of the engine E and the crank shaft 150 which is formed integrally with the transmission case unit. The unit swing case 134 is swingably pivoted to the body frame 121 by the link mechanism 118 via a pivot shaft 118a (see FIG. 8).

A primary shaft 136 is rotatably supported in the unit swing case 134 via a pair of ball bearings 135, and a driven-side pulley 137 of the V-belt automatic transmission 131 is rotatably fitted in the primary shaft 136. The centrifugal clutch 132 is disposed on one side in the widthwise direction of the vehicle, while a spur gear 138 is provided at the other side in the widthwise direction of the vehicle. Further, an intermediate shaft 141 having a large-diameter gear 139 and a small-diameter gear 140 is rotatably supported in the unit swing case 134 via a needle bearing 142, and also a gear shaft portion 144a of the drive shaft 144 having a drive gear 143 is rotatably supported in the unit swing case 134 via a pair of ball bearings 145. In this way, in the gear reduction device 133, the driving force transmitted to the spur gear 138 is transmitted to the large-diameter gear 139, and then is also transmitted to the drive gear 143 which is meshed with the small-diameter gear 140. The drive shaft 144 protrudes from the unit swing case 134 towards the other side in the lateral side of the vehicle.

A portion of the drive shaft 144 protruding from the unit swing case 134 is attached and fixed to the drive shaft 144 by spline-fitting an inner hub 85 of the rear wheel 76 to the drive shaft 144 and by fastening a nut 147 to the drive shaft. Further, an electric motor 63 including a rotor 94, a stator 95, and other components is attached to a portion 144*c* extending from a portion 144*b* of the drive shaft 144, to which the rear wheel WR is mounted, in the widthwise direction of the vehicle. The electric motor 63 has the same configuration as that of the first embodiment, and is disposed on the other side (right side in FIG. 9) of the unit swing case 134 in the widthwise direction of the vehicle to transmit the driving force to the drive shaft 144 of the rear wheel WR.

The motor housing 90 is supported on the portion 144*c* extending in the other side from the drive shaft 144 in the widthwise direction of the vehicle via the pair of bearing sections 91, 91 and 92 which are disposed on both sides thereof in the widthwise direction of the vehicle. Further, the motor housing 90 supported by the drive shaft 144 is disposed rather rearward than the other end portion of the crankcase portion 134*b* of the unit swing case 134 in the widthwise direction of the vehicle, and rather inward than the other end portion in the widthwise direction of the vehicle (see FIG. 9). Furthermore, a connection member 110 connected to the motor housing 90 by a bolt 113 is connected to a connection protrusion 148 provided on the crankcase portion 134*b*. In this way, the rear wheel WR is supported in a double-sided structure by the transmission case portion 134*a* provided at one side of the unit swing case 134 in the widthwise direction of the vehicle, and the connection member 110 connected to the unit swing case 134. Although not illustrated, the bottom surface of the connection member 110 is positioned rather upward than the bottom surface of the unit swing case 134.

With the scooter type motorcycle 1A including the above configuration, the driving force of the engine E is transmitted to the rear wheel WR via the V-belt automatic transmission 131, the centrifugal clutch 132, the gear reduction device 133, the drive shaft 144, and the rear wheel 76. Further, the driving force of the electric motor 63 is transmitted to the rear wheel WR via the drive gear 97 connected to the rotor sleeve 108, the large gear 98, the small gear 99, the driven gear 102, the drive shaft 144, and the rear wheel 76. Furthermore, if the driving force is transmitted from the driving wheel side at the time of deceleration of the vehicle, the electric motor 63 serves as a generator to generate a so-called regenerative braking force and recover kinetic energy of the vehicle 1A as regenerative energy.

Accordingly, with the scooter type motorcycle 1A according to this embodiment, since the motor housing 90 is supported by the extension portion 144*c* extending from the portion 144*b*, to which the rear wheel WR is mounted, of the drive shaft 144 in the other side of the widthwise direction of the vehicle via the pair of bearing sections 91, 91 and 92 disposed on both sides thereon in the widthwise direction of the vehicle, the electric motor 63 can be directly supported by the drive shaft 144 secured with the strength. Further, since the rotor 94 is supported by the drive shaft 144 between the pair of bearing sections 91, 91 and 92, the heavy rotor 94 can be reliably supported by the drive shaft 144. Furthermore, the driving mechanism for the electric motor 63 can be compact in size, and the design freedom of the electric motor 63 can be improved as much as the size becomes compact. In addition to this, the driving force of the electric motor 63 can be transmitted to the drive shaft 144 of the rear wheel WR without passing through a plurality of transmission mechanisms, thereby suppressing the power loss in the transmission to a minimum.

Other configuration and operation are the same as those of the first embodiment.

The inventions are not limited to the above-described embodiments, and modifications and variations can be appropriately made.

DESCRIPTION OF REFERENCE NUMERALS

1 Large motorcycle (Hybrid saddle-type vehicle)
1A Scooter type motorcycle (Hybrid saddle-type vehicle)
2 Body frame
6 Pivot shaft
6*a* End portion
7 Swing arm (Rear-wheel supporting member)
7*a* Support portion
7*b* First arm portion
7*c* Second arm portion
7*d* Cross portion
7*f* Bottom surface
52, 144 Drive shaft
53 Axial passage
54 Radial passage
59 Oil introducing rib (Rib)
61 Oil collecting rib (Rib)
62, 130 Power transmission mechanism
63 Electric motor
76 Rear wheel
82 Wheel hub portion
85 Inner hub
86 Outer hub
90 Motor housing
91, 92 Ball bearing (Bearing portion)
94 Rotor
95 Stator
103 Speed reduction mechanism
110 Connection member
110*a* Bottom surface
118 Link mechanism
121 Cradle type body frame (Body frame)
134 Unit swing case (Rear wheel support member)
134*a* Transmission case unit
134*b* Crankcase portion
E Engine (Internal combustion engine)
WR Rear wheel

The invention claimed is:

1. A hybrid saddle-type vehicle comprising:
a rear-wheel supporting member swingably attached to a body frame and adapted to support a rear wheel;
a power transmission mechanism configured to transmit a power of an internal combustion engine to a drive shaft of the rear wheel from one side of the rear-wheel supporting member in a widthwise direction of a vehicle; and
an electric motor configured to transmit a driving force to the drive shaft from the other side of the rear-wheel supporting member in the widthwise direction,
wherein the electric motor includes a motor housing that accommodates a stator and a rotor therein and is fixed to the rear-wheel supporting member,
wherein the motor housing is supported on an extension portion extending in the other side in the widthwise direction from a portion of the drive shaft to which the rear wheel is mounted, via a pair of bearing sections disposed on both sides of the motor housing in the widthwise direction, and wherein the motor housing is disposed rearward of the pivot shaft and inward of an end portion of the pivot shaft; and wherein the rotor is rotatably supported by the drive shaft between the pair of the bearing sections.

2. The hybrid saddle-type vehicle according to claim 1, wherein the rear-wheel supporting member is a swing arm swingably supported on the body frame via a pivot shaft.

3. The hybrid saddle-type vehicle according to claim 2, wherein a connection member connecting the motor housing and the swing arm is disposed upward of a bottom surface of the swing arm.

4. The hybrid saddle-type vehicle according to claim 1, wherein the swing arm includes a first arm portion extending from one side of a support portion supporting the pivot shaft in the widthwise direction to a lateral side of the rear wheel, a second arm portion extending from the other side of the support portion in the widthwise direction to a forward of the rear wheel, and a cross portion connecting a rear portion of the second arm portion and the first arm portion, and wherein the connection member connecting the motor housing and the swing arm is connected to the rear portion of the second arm portion from which the cross portion extends.

5. The hybrid saddle-type vehicle according to claim 1, wherein the rear-wheel supporting member is a unit swing case which is swingably supported on the body frame via a link mechanism and covers the internal combustion engine.

6. The hybrid saddle-type vehicle according to claim 1, wherein the drive shaft is provided therein with an axial passage extending in an axial direction from the other end portion thereof, and a radial passage extending in a radial direction from the axial passage and opened near the bearing section which is positioned at an intermediate portion of the drive shaft, and wherein the motor housing is provided with ribs adapted to supply splash oil scattered in the motor housing to the axial passage.

7. The hybrid saddle-type vehicle according to claim 1, wherein the rear wheel includes a wheel hub portion having an inner cylindrical hub provided at the drive shaft and an outer cylindrical hub provided radially outward of the inner hub, and at least a part of the bearing section supporting the motor housing at a side of the power transmission mechanism is disposed to overlap the outer hub in the widthwise direction.

8. The hybrid saddle-type vehicle according to claim 1, wherein the electric motor further includes a speed reduction mechanism that decelerates the driving force and transmits it to the drive shaft, and wherein the rotor is rotatably supported around the drive shaft, and the speed reduction mechanism is disposed on the other side of the drive shaft in the widthwise direction.

9. A hybrid saddle-type vehicle comprising:

a rear-wheel supporting member swingably attached to a body frame and adapted to support a rear wheel;

a power transmission mechanism configured to transmit power of an internal combustion engine to a drive shaft of the rear wheel from one side of the rear-wheel supporting member in a widthwise direction of a vehicle; and an electric motor configured to transmit a driving force to the drive shaft from the other side of the rear-wheel supporting member in the widthwise direction, said electric motor includes a motor housing accommodating a stator and a rotor therein and being fixed to the rear-wheel supporting member, said motor housing being supported on an extension portion extending in the other side in the widthwise direction from a portion of the drive shaft to which the rear wheel is mounted, via a pair of bearing sections disposed on both sides of the motor housing in the widthwise direction, and wherein the motor housing is disposed rearward of the pivot shaft and inward of an end portion of the pivot shaft;

said rotor being rotatably supported by the drive shaft between the pair of the bearing sections; and said drive shaft being provided therein with an axial passage extending in an axial direction from the other end portion thereof, and a radial passage extending in a radial direction from the axial passage and opened near the bearing section which is positioned at an intermediate portion of the drive shaft; and said motor housing being provided with ribs adapted to supply splash oil scattered in the motor housing to the axial passage.

10. The hybrid saddle-type vehicle according to claim 9, wherein the rear-wheel supporting member is a swing arm swingably supported on the body frame via a pivot shaft.

11. The hybrid saddle-type vehicle according to claim 10, wherein the motor housing is disposed rearward of the pivot shaft and inward of an end portion of the pivot shaft.

12. The hybrid saddle-type vehicle according to claim 10, wherein a connection member connecting the motor housing and the swing arm is disposed upward of a bottom surface of the swing arm.

13. The hybrid saddle-type vehicle according to claim 9, wherein the swing arm includes a first arm portion extending from one side of a support portion supporting the pivot shaft in the widthwise direction to a lateral side of the rear wheel, a second arm portion extending from the other side of the support portion in the widthwise direction to a forward of the rear wheel, and a cross portion connecting a rear portion of the second arm portion and the first arm portion, and wherein the connection member connecting the motor housing and the swing arm is connected to the rear portion of the second arm portion from which the cross portion extends.

14. The hybrid saddle-type vehicle according to claim 9, wherein the rear-wheel supporting member is a unit swing case swingably supported on the body frame via a link mechanism for covering the internal combustion engine.

15. The hybrid saddle-type vehicle according to claim 9, wherein the electric motor further includes a speed reduction mechanism that decelerates the driving force and transmits it to the drive shaft, and wherein the rotor is rotatably supported around the drive shaft, and the speed reduction mechanism is disposed on the other side of the drive shaft in the widthwise direction.

16. A hybrid saddle-type vehicle comprising:

a rear-wheel supporting member swingably attached to a body frame and adapted to support a rear wheel;

a power transmission mechanism configured to transmit power from an internal combustion engine to a drive shaft of the rear wheel from one side of the rear-wheel supporting member in a widthwise direction of a vehicle; and an electric motor configured to transmit a driving force to the drive shaft from the other side of the rear-wheel supporting member in the widthwise direction;

said electric motor including a motor housing accommodating a stator and a rotor therein and being fixed to the rear-wheel supporting member;

said motor housing being supported on an extension portion extending in the other side in the widthwise direction from a portion of the drive shaft to which the rear wheel is mounted, via a pair of bearing sections disposed on both sides of the motor housing in the widthwise direction, and wherein the motor housing is disposed rearward of the pivot shaft and inward of an end portion of the pivot shaft;

said rotor being rotatably supported by the drive shaft between the pair of the bearing sections;

said rear wheel includes a wheel hub portion having an inner cylindrical hub provided at the drive shaft and an outer cylindrical hub provided radially outward of the inner hub; and at least a part of the bearing section supporting the motor housing at a side of the power transmission mechanism is disposed to overlap the outer hub in the widthwise direction.

17. The hybrid saddle-type vehicle according to claim 16, wherein the rear-wheel supporting member is a swing arm swingably supported on the body frame via a pivot shaft.

18. The hybrid saddle-type vehicle according to claim 17, wherein the motor housing is disposed rearward of the pivot shaft and inward of an end portion of the pivot shaft.

19. The hybrid saddle-type vehicle according to claim 17, wherein a connection member connecting the motor housing and the swing arm is disposed upward of a bottom surface of the swing arm.

20. The hybrid saddle-type vehicle according to claim 16, wherein the swing arm includes a first arm portion extending from one side of a support portion supporting the pivot shaft in the widthwise direction to a lateral side of the rear wheel, a second arm portion extending from the other side of the support portion in the widthwise direction to a forward of the rear wheel, and a cross portion connecting a rear portion of the second aim portion and the first arm portion, and wherein the connection member connecting the motor housing and the swing arm is connected to the rear portion of the second arm portion from which the cross portion extends.

* * * * *